United States Patent
Lam et al.

(10) Patent No.: US 7,716,658 B2
(45) Date of Patent: May 11, 2010

(54) METHOD AND APPARATUS FOR OPTIMIZING PATCHING OF OBJECTS CONTAINING REFERENCES

(75) Inventors: Ioi K. Lam, Mountain View, CA (US); Oleg A. Pliss, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1187 days.

(21) Appl. No.: 11/298,776

(22) Filed: Dec. 9, 2005

(65) Prior Publication Data

US 2007/0169082 A1 Jul. 19, 2007

(51) Int. Cl.
*G06F 9/44* (2006.01)
(52) U.S. Cl. ....................................... 717/162
(58) Field of Classification Search ............... 717/162, 717/165, 151
See application file for complete search history.

(56) References Cited

U.S. PATENT DOCUMENTS

| | | | | |
|---|---|---|---|---|
| 7,328,007 B2 * | 2/2008 | Rajaram | ...................... | 455/420 |
| 7,509,636 B2 * | 3/2009 | McGuire et al. | ............ | 717/168 |
| 7,546,594 B2 * | 6/2009 | McGuire et al. | ............ | 717/168 |
| 2002/0100028 A1 * | 7/2002 | Kosaka et al. | ................ | 717/139 |
| 2005/0132382 A1 * | 6/2005 | McGuire et al. | ............ | 719/311 |
| 2005/0203968 A1 * | 9/2005 | Dehghan et al. | ............ | 707/203 |
| 2005/0210459 A1 * | 9/2005 | Henderson et al. | .......... | 717/168 |
| 2006/0020936 A1 * | 1/2006 | Wyatt | .......................... | 717/162 |

OTHER PUBLICATIONS

Becker et al. "Smooth transitions between bump rendering algorithms", Sep. 1993, ACM, pp. 183-189.*
Elber et al. "Second-order surface analysis using hybrid symbolic and numeric operators", Apr., 1993, ACM, TOG vol. 12, Issue 2, pp. 160-178.*

* cited by examiner

*Primary Examiner*—Ted T Vo
*Assistant Examiner*—Anna Deng
(74) *Attorney, Agent, or Firm*—Park, Vaughan & Fleming LLP; Mark Spiller (57) ABSTRACT

One embodiment of the present invention provides a method and a system for patching a set of objects containing references. The system uses a location structure to keep track of the locations of references within the set of objects. During the patching process, the system converts the references within the set objects from an absolute form into an offset-based form, where offsets are computed with respect to base addresses of objects. The system then applies an offset-based patch to the set of objects and to the location structure using a binary-patching technique. After applying the patch, the system converts the references in the set of objects back into absolute form. By using an offset-based patch, the system reduces the number of reference changes that need to be specified in the patch, thereby reducing the size of the patch.

18 Claims, 5 Drawing Sheets

METHOD AND APPARATUS FOR OPTIMIZING PATCHING OF OBJECTS CONTAINING REFERENCES

BACKGROUND

1. Field of the Invention

The present invention relates to the process of distributing software to mobile devices. More specifically, the present invention relates to a method and an apparatus for optimizing patching of objects containing references within mobile-computing devices.

2. Related Art

The Java 2 Platform, Micro Edition (J2ME™), has become a very popular software platform for memory-constrained devices such as wireless devices. Motorola, Nokia, NTT DoCoMo, RIM, Siemens, and many other key players in the wireless device industry have shipped a large number of J2ME-enabled devices. In fact, hundreds of millions of J2ME-enabled mobile phones have been shipped during the past few years.

Many J2ME™ environments include large machine-generated binary tables. One notable example is the system ROM image, which contains bytecodes and other metadata for JAVA™ system classes. Such tables are often large, on the order of megabytes, and sometimes need to be patched. For instance, if a bug is found in one of the system classes, the system ROM image may need to be rebuilt and then updated across a large installed base of devices. Because the bandwidth between the device and an update server may be low, transferring a new updated image to a large number of devices may take a long time.

This bandwidth problem can be reduced by sending only the difference (a "binary diff") between the old and new images to the device. The device then converts the old image to the new image by using a "binary patching" technique. However, for an image that contains a large number of references, making even a minor change to the location of objects within the image can cause a large number of the references within the objects to change, thereby dramatically increasing the number of differences between the two images and thus increasing the size of the patch.

Hence, what is needed is a method and an apparatus for patching objects containing references without the above-described problems.

SUMMARY

One embodiment of the present invention provides a method and a system for patching a set of objects containing references. The system uses a location structure to keep track of the locations of references within the set of objects. During the patching process, the system converts the references within the set objects from an absolute form into an offset-based form, where offsets are computed with respect to base addresses of objects. The system then applies an offset-based patch to the set of objects and to the location structure using a binary-patching technique. After applying the patch, the system converts the references in the set of objects back into absolute form. By using an offset-based patch, the system reduces the number of reference changes that need to be specified in the patch, thereby reducing the size of the patch.

In a variation on this embodiment, converting an absolute reference into the offset-based form comprises dividing the absolute reference into an address for the target object of the absolute reference, and an offset for a target location of the absolute reference within the target object.

In a further variation, the location structure includes a table containing addresses for objects in the set of objects. An entry for a given object in the table points to a sub-table containing offsets for each reference contained in the given object. This location structure allows the system to determine the locations of all references in the set of objects.

In a further variation, the system converts an absolute reference into an offset-based reference by obtaining the address for the target object of the absolute reference and then producing an offset for the reference by subtracting the base address of the target object from the absolute reference. The system stores the offset in place of the absolute reference within the source object that contains the absolute reference.

In a variation on this embodiment, the system uses the method to patch a set of objects on a mobile device with a limited-bandwidth network connection. Using the offset-based form for references results in a smaller patch, which reduces the amount of data that needs to be transferred across the limited-bandwidth network connection during the patching process.

In a further variation, the system generates the offset-based patch by obtaining a previous version of the set of objects and a new version of the set of objects. Both the previous version of the set of objects and the new version of the set of objects include a corresponding location structure. The system decomposes the references in both sets of objects to convert them into an offset-based form, and then calculates a set of differences between the offset-based forms. The system compresses the set of differences to form the offset-based patch and then sends the offset-based patch to the mobile device to patch the previous version of the set of objects located on the mobile device.

In a variation on this embodiment, the system aggregates adjacent objects in the set of objects to reduce the size of the location structure.

In a variation on this embodiment, the set of objects includes a program binary. This program binary can include a large machine-generated binary table in the JavaME™ environment.

In a further variation, the program binary includes a JAVA™ system ROM image.

Table 1 illustrates a system ROM image in accordance with an embodiment of the present invention.

Table 2 illustrates a system ROM image with resolved references in accordance with an embodiment of the present invention.

Table 3 illustrates modifications that comprise a patch of a system ROM image in accordance with an embodiment of the present invention.

Table 4 illustrates the conversion of absolute addresses to offsets in a system ROM image in accordance with an embodiment of the present invention.

Table 5 illustrates a table containing the original targets of references in accordance with an embodiment of the present invention.

Table 6 illustrates the reduced number of changes needed for a patch when references are replaced by offsets in accordance with an embodiment of the present invention.

Table 7 illustrates an updated table of reference targets in accordance with an embodiment of the present invention.

Table 8 illustrates a patched system ROM image in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Patching Binary Tables

Figure 1:
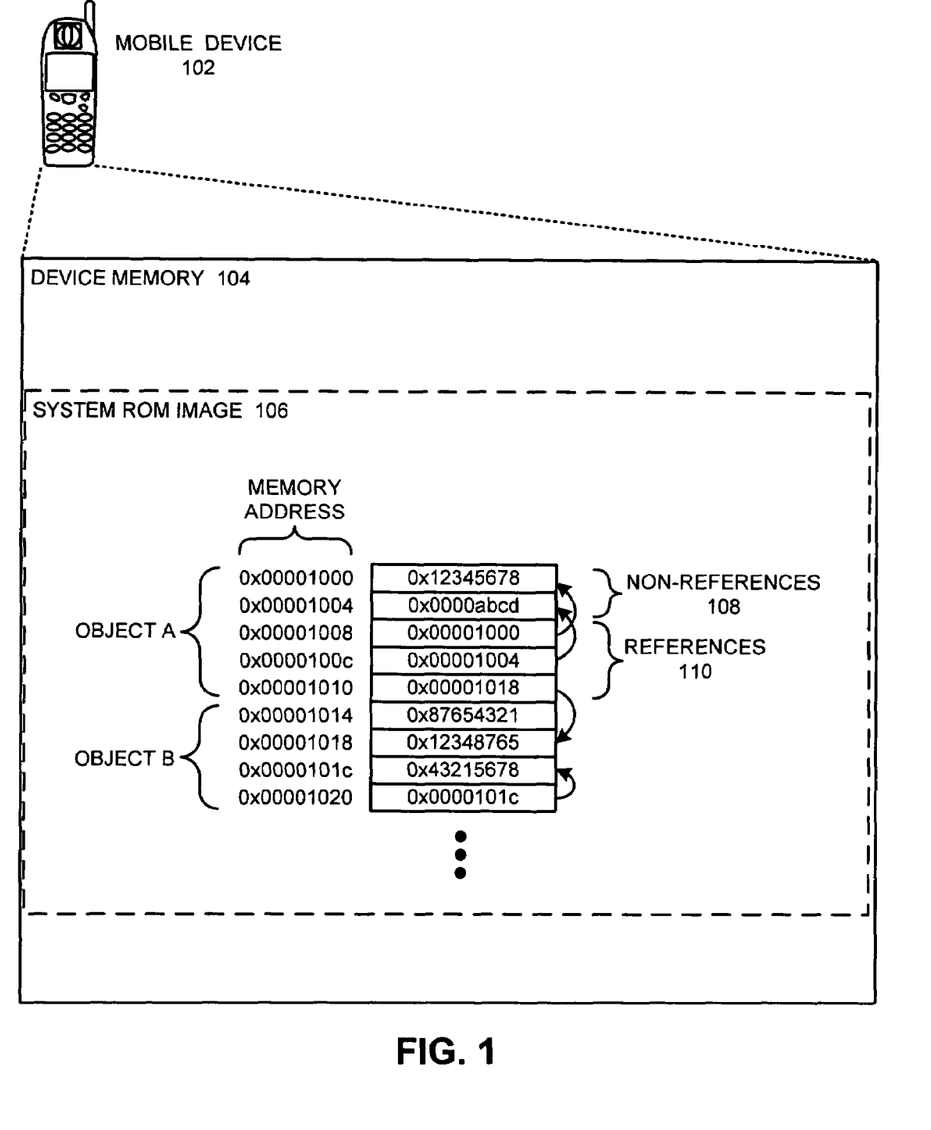
FIG. 1 illustrates a mobile device in accordance with an embodiment of the present invention.

FIG. 1 illustrates a mobile device 102 which includes device memory 104. Device memory 104 includes a system ROM image 106, which contains bytecodes and other metadata for JAVA™ system classes. Binary tables, such as the system ROM image 106, include objects that contain both normal (non-reference) data 108 as well as memory references 110. Since programs are usually installed in binary form, and the source code of proprietary software is typically confidential, patches sent to update installed program executables often directly modify the program executable. These patches can be distributed using a binary-patching technique, e.g. by creating a binary program that is downloaded to the device and then executed to perform the patching operation.

As mentioned previously, the system ROM image may need to be updated across a large installed base, and the updating process may be constrained by bandwidth limitations of the set of devices to be updated. Because of the presence of references, making a small change to the location of objects in the image (for example by adding an object to the image) may cause a large number of the references to change, thereby dramatically increasing the differences between the two images and thus the size of the patch.

A portion of an exemplary system ROM image is illustrated in Table 1. In this example, location [0] and location [1] contain two binary numbers, 0x12345678 and 0x0000abcd, respectively. These locations are followed by three references: location [2] refers to location [0], location [1] refers to location [2], and so forth.

TABLE 1

```
int rom_image[ ] = {
    0x12345678,        // location[0]
    0x0000abcd,        // location[1]
    &rom_image[0],     // location[2]
    &rom_image[1],     // location[3]
    &rom_image[2]      // location[4]
};
```

When the table is installed on the device, the references are resolved according to the actual address of the ROM image. For example, if the rom_image starts at address 0x00001000, the table would be stored as illustrated in Table 2.

TABLE 2

```
int rom_image[ ] = {
    0x12345678,    // at 0x00001000
    0x0000abcd,    // at 0x00001004
    0x00001000,    // at 0x00001008 => &rom_image[0]
    0x00001004,    // at 0x0000100c => &rom_image[1]
    0x00001008,    // at 0x00001010 => &rom_image[2]
};
```

The problem with patching is that changing the size of the table causes changes in most of the references, even those not directly related to the area of modification. For example, if the above image is patched by adding a new value before location [0], then the references in locations [2-4] will also be modified and will need to be patched. The locations that would be changed are marked by a '*' in Table 3. In this example, even though only 20% of the original image changed (one out of five locations), the patch download comprises 80% of the original image (since four of the original five locations changed).

TABLE 3

```
int rom_image[ ] = {
*   0xabcdabcd,    // now at 0x00001000
    0x12345678,    // now at 0x00001004
    0x0000abcd,    // now at 0x00001008
*   0x00001004,    // now at 0x0000100c => &rom_image[0]
*   0x00001008,    // now at 0x00001010 => &rom_image[1]
*   0x0000100c,    // now at 0x00001014 => &rom_image[2]
};
```

Using Tables of References to Reduce Patch Size

The present invention localizes the effects of changes by adding a small table to the original image that remembers object locations that contain references. This approach takes advantage of the observation that even if the locations of objects change, the offsets of the references within the objects and the offset of the reference targets within the target objects often remain the same.

One embodiment of the present invention uses additional memory on the device to track references and the locations of objects, and allows the patching process to be implemented by:

1. changing the references from absolute addresses (direct pointers) to offsets;
2. generating a table specifying the original locations of the references;
3. patching the entire image using a naïve binary patch technique;
4. updating the table to reflect the new locations of the references; and
5. changing the references from offsets back to absolute addresses, which involves using the table to find the references and compute their new targets.

For instance, for the image in Table 1, the references are changed from absolute addresses to offsets (step 1, as indicated by a '*' in Table 4). Next, the system generates a table containing the original targets of the references (step 2, shown in Table 5). As a result, fewer changes are transmitted when the entire image is patched using a naïve binary patch technique (step 3). Only one item in the image is patched (as illustrated by the '*' in Table 6). In the next step (step 4), the table is updated to reflect the new targets of the references. The system uses this updated table (illustrated in Table 7) to convert the references from offsets back to absolute addresses (step 5, illustrated in Table 8).

TABLE 4

```
int rom_image[ ] = {
    0x12345678,   // at 0x00001000
    0x0000abcd,   // at 0x00001004
  * 0x00000000,   // at 0x00001008 => &rom_image[0]
  * 0x00000004,   // at 0x0000100c => &rom_image[1]
  * 0x00000008,   // at 0x00001010 => &rom_image[2]
};
```

TABLE 5

| Reference | target |
|---|---|
| &rom_image[0] | 0x00001000 |
| &rom_image[1] | 0x00001004 |
| &rom_image[2] | 0x00001008 |

TABLE 6

```
int rom_image[ ] = {
  * 0xabcdabcd,   // now at 0x00001000
    0x12345678,   // now at 0x00001004
    0x0000abcd,   // now at 0x00001008
    0x00000000,   // now at 0x0000100c => &rom_image[0]
    0x00000004,   // now at 0x00001010 => &rom_image[1]
    0x00000008,   // now at 0x00001014 => &rom_image[2]
};
```

TABLE 7

| Reference | target |
|---|---|
| &rom_image[0] | 0x00001004 |
| &rom_image[1] | 0x00001008 |
| &rom_image[2] | 0x0000100c |

TABLE 8

```
int rom_image[ ] = {
    0xabcdabcd,   // now at 0x00001000
    0x12345678,   // now at 0x00001004
```

TABLE 8-continued

```
    0x0000abcd,   // now at 0x00001008
    0x00001004,   // now at 0x0000100c => &rom_image[0]
    0x00001008,   // now at 0x00001010 => &rom_image[1]
    0x0000100c,   // now at 0x00001014 => &rom_image[2]
};
```

Further Optimizing the Table of References

While the technique described in the previous section reduces the size of the image patch, the system also needs to transfer and patch changes to the table of reference locations and targets. Therefore, a large number of changes to this table may still potentially require the transfer of data for each reference with an updated or changed target.

Figure 2:
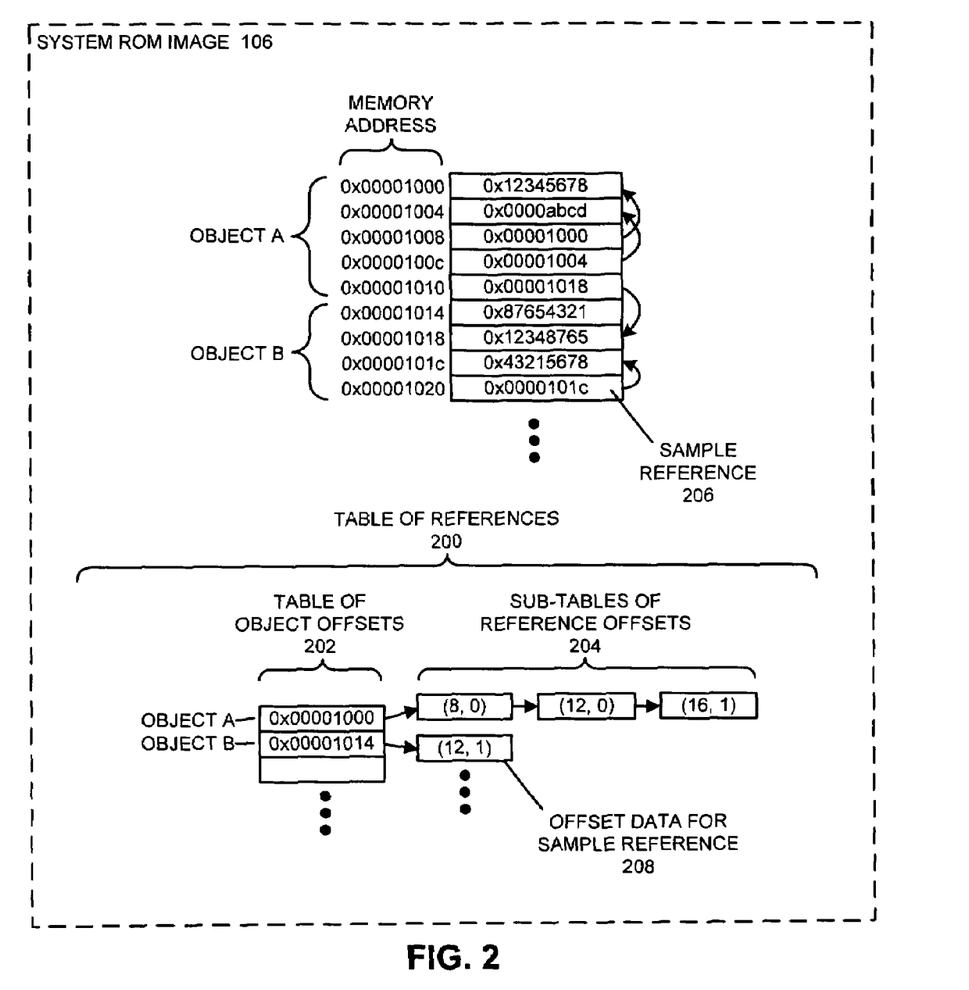
FIG. 2 illustrates a system ROM image with references containing absolute addresses and an optimized table of references in accordance with an embodiment of the present invention.

FIG. 2 illustrates a system ROM image 106 with references containing absolute addresses and a table of references 200 with an optimized format. The table of references contains data for all of the references in the image, and is indexed by a table of object offsets 202 that contains the base (starting) address of each object in the image. An entry corresponding to each object points to a sub-table of reference offsets 204. These sub-tables contain for every reference in a source object a pair of data values corresponding to the offset of the reference in the source object and the index to the target object in the table of table offsets 202 (which allows the lookup of the base address of the target object).

Figure 3:
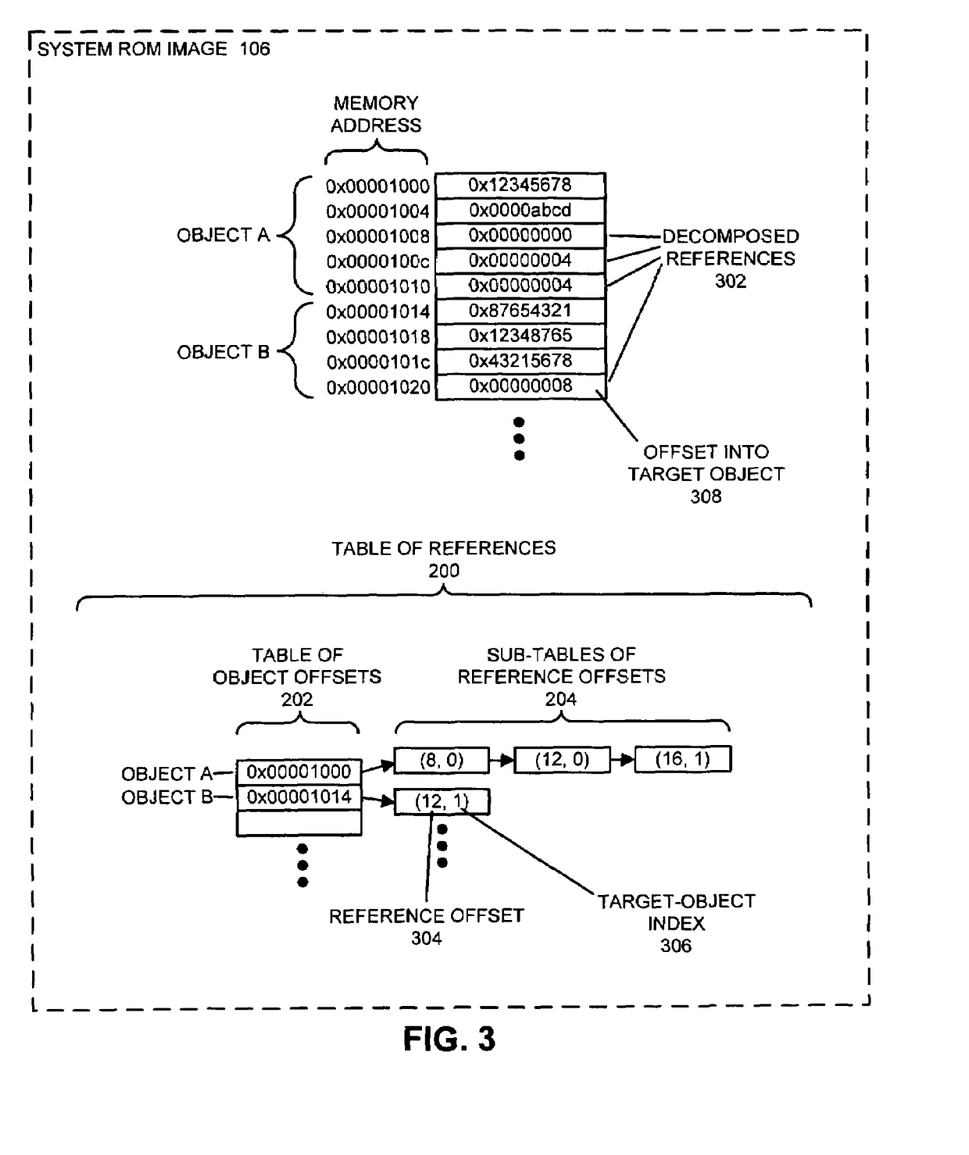
FIG. 3 illustrates a system ROM image with decomposed references containing absolute addresses and an optimized table of references in accordance with an embodiment of the present invention.
Figure 4:
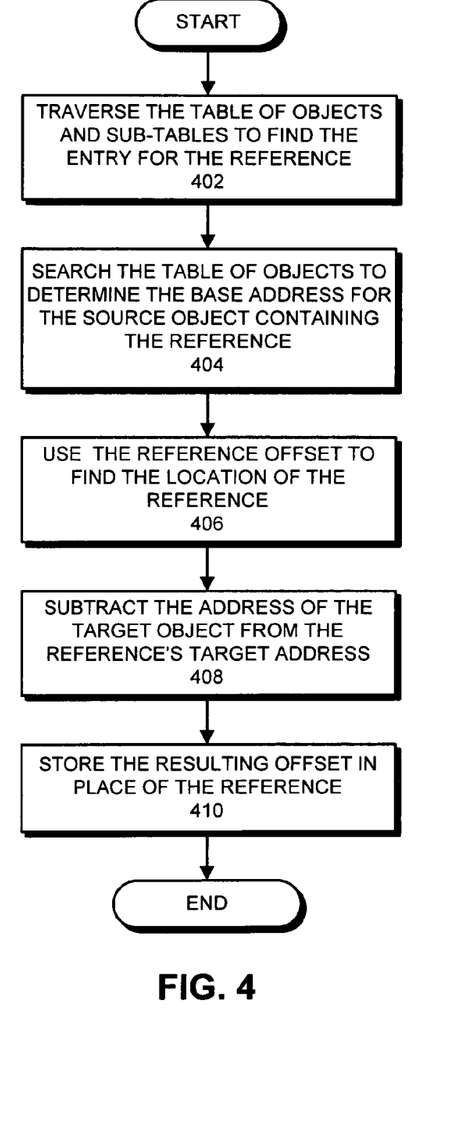
FIG. 4 presents a flow chart illustrating the decomposition of an absolute reference in accordance with an embodiment of the present invention.

FIG. 3 illustrates the system ROM image of FIG. 2 with decomposed references, and FIG. 4 illustrates the decomposition of a reference. To decompose a reference in an image, the system traverses the table of objects and the linked sub-tables to find the offsets for the reference (step 402). For each given reference, the system searches the table of objects to determine the base address for the source object containing the reference (step 404). For instance, in FIG. 2, for the sample reference 206 at memory address 0x00001020 (in Object B), the entry for Object B in the table of object offsets 202 contains the base address for Object B and also points to a corresponding piece of offset data for the sample reference 208. The system combines the base address of the source object (Object B) with the offset of the reference in the source object 304 to find the location of the reference (step 406). The system then proceeds to determine the base address of the target object by using the target-object index 306 as an index into the table of object offsets. The system subtracts the target object's base address from the target address (step 408) and stores the resulting value in the location of the reference (step 410). As a result, the location of the reference now contains the offset of the target address from the base address of the target object 308.

For example, for the sample reference 206, the system finds the exact address of the reference by combining the base address of Object B (0x00001014) with 12, resulting in the location of the reference, memory address 0x00001020. The system decomposes the reference by first using the target-object index 306 to determine the base address of the target object (Object B, memory address 0x00001014). Then, the system subtracts the target object's base address from the target address in the reference (0x000101c), resulting in an offset of eight, which (correctly) corresponds to the third field of Object B referred to by the sample reference 206. This value is stored in the memory address 0x00001020 in FIG. 3.

Figure 5:
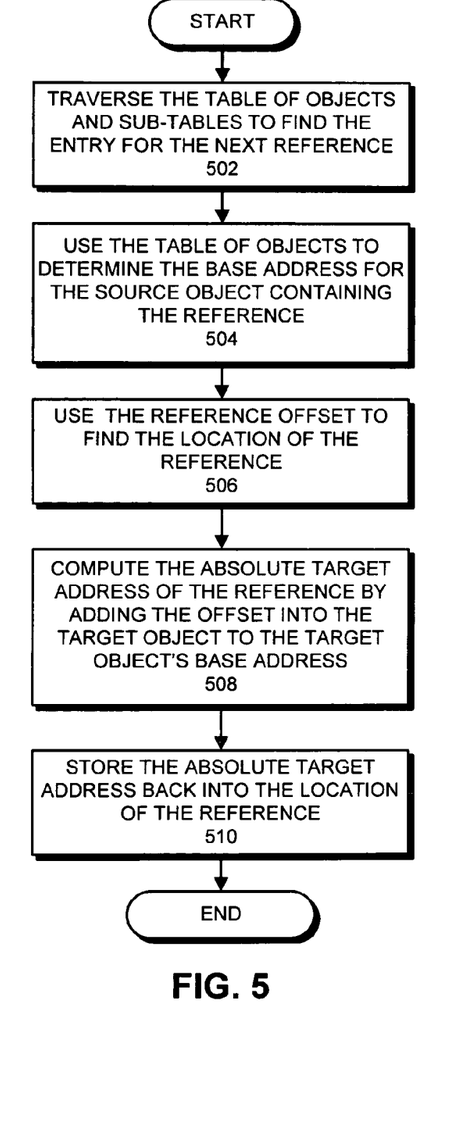
FIG. 5 presents a flow chart illustrating the composition of an absolute reference from an offset-based reference in accordance with an embodiment of the present invention.

FIG. 5 illustrates the process of converting a reference from offset-based form back into absolute form following the patching of the image and tables using a binary difference technique. The system traverses the table of objects and the linked sub-tables to find the offsets for the next reference (step 502). For each given reference, the system uses the table of objects and reference offset 304 in the same manner as described above to determine the base address for the source object containing the reference (steps 504 and 506). After finding the location of the reference, the system determines the target object's base address as above, and then produces the absolute target address by adding the target object's base address to the offset into the target object 308 (step 508). The resulting absolute target address is stored back into the reference address (step 510).

For example, for the sample reference 206, the system computes the location of the reference, memory address 0x00001020, as previously. The system composes the absolute target address by computing the target object's base address as before (memory address 0x00001014) and adding eight (the value in memory address 0x00001020), resulting in the absolute target address 0x0000101c.

The method described above further localizes the effects of changes to references and objects. If a change somewhere in the image moves the location of the object in memory, the only piece of data patched is the address of the object in the table of object offsets 202; the offsets remain the same, and do not need patching. Of course, if an individual object is changed, for instance by adding an additional reference, additional patches will be required. Changing the target address of one reference potentially changes the corresponding entry in the sub-table and perhaps the offset (i.e. the offset into the target object 308) which is located in the object itself.

Note that in this embodiment, the new image needs to retain all of the objects from the previous image. Since references identify objects by index in the table of object offsets 202, an object cannot be taken out of the table. Therefore, new objects can only be added to the image, e.g. at the end of the table of object offsets, and existing objects cannot be removed. Note also that the table of references can be implemented in numerous ways, and that the present invention is not dependent on this embodiment. For instance, the table can also be organized by grouping references by the location or objects they point to.

The table of references 200 can be large, for instance in an image with many small objects and many references. However, the objects in the set of objects do not need to be limited to language objects. The system can further reduce the number of patches (for some sets of changes) and the table memory size by aggregating the references of sets of objects into larger, virtual objects in the table. This effectively changes the granularity of the table, potentially reducing the size of the table at the cost of more differences (or vice versa).

Patching Devices

Figure 6:
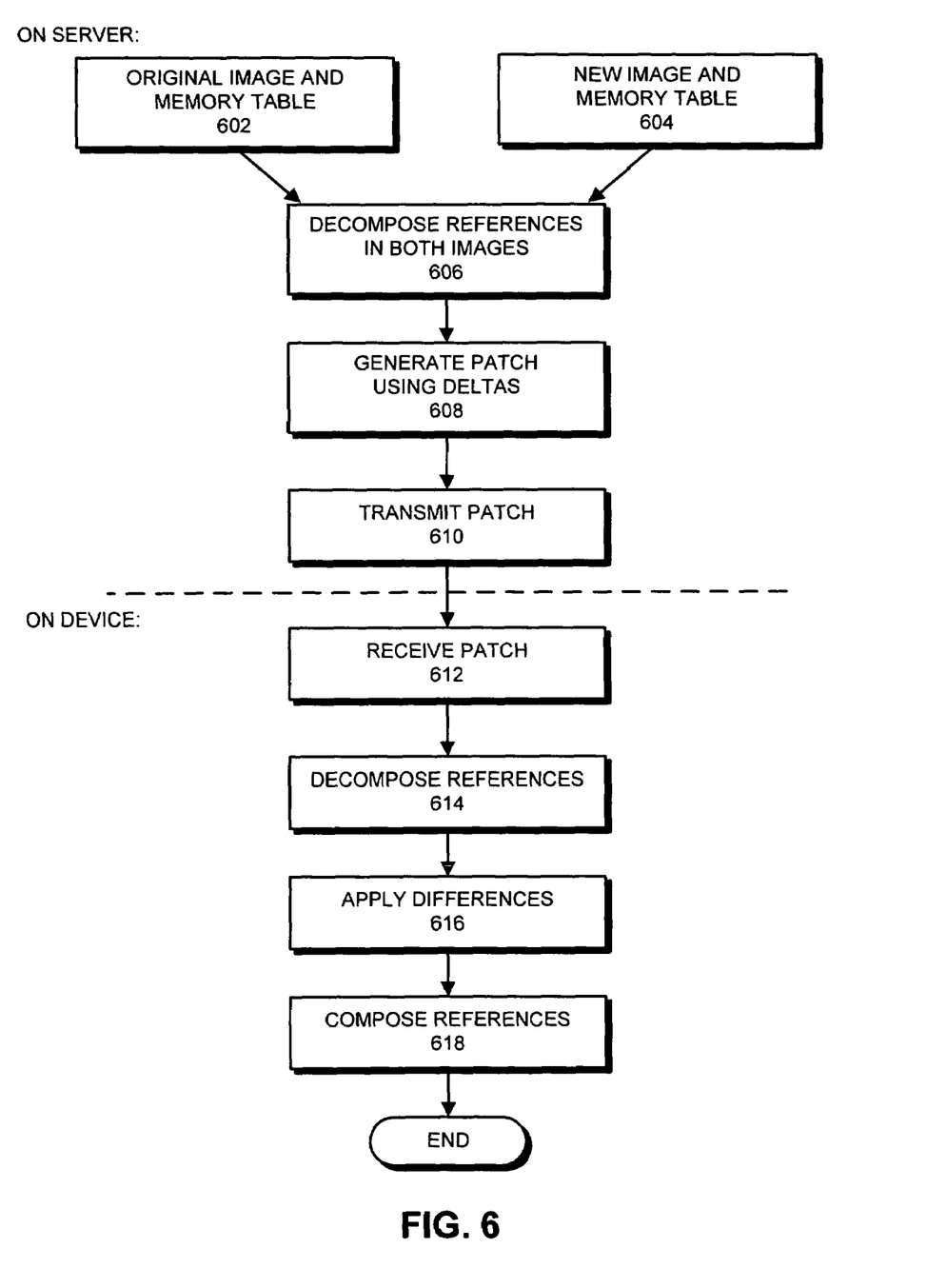
FIG. 6 presents a flow chart illustrating the updating of an image on a mobile device in accordance with an embodiment of the present invention.

FIG. 6 illustrates the update of a system ROM image on a mobile device. The system starts with two images; an original image and associated memory table 602, and a new, updated image with an associated memory table 604. The system decomposes the references in both images (step 606), and then generates a patch of the differences between the two decomposed images (step 608). Note that computing differences for sequences of binary data is a common technique. The server then transmits the patch to the target device (step 610).

Upon receiving the patch (step 612), the device proceeds to decompose the references in the local image to be updated (step 614). The device then applies the differences to the decomposed image (step 616), after which it composes the references back to absolute addresses (step 618). At that point, the image on the device has been successfully updated to become the new version.

The net effect of the present invention is to reduce the size of the "patch files" that are downloaded to perform a patch. This reduces the cost to the network operator and speeds up the patching process, at the cost of transformation steps and the memory tables. Effectively, the system uses some additional memory space and computation to reduce the network bandwidth used. Note that since the memory tables only need to be loaded during patching, and not while executing the application, there is no sacrifice in execution speed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for patching a set of objects containing references, comprising:
    using a location structure to keep track of the locations of references within the set of objects, wherein the location structure includes a table that contains addresses for objects in the set of objects, and wherein each object in the set of objects includes zero or more references;
    converting the references within the set of objects from absolute references into offset-based references, wherein offsets are computed with respect to base addresses of objects, wherein said offsets are stored in place of said absolute references, wherein converting the absolute references into the offset-based references involves, for each absolute reference in said each object in the set of objects:
        obtaining a base address from the table for the object of the absolute reference;
        computing an offset for an offset-based reference by subtracting the base address of the object from the absolute reference;
    applying an offset-based patch to the set of objects and to the location structure using a binary-patching technique; and
    converting the references in the set of objects from offset-based references back into absolute references, wherein said absolute references are stored in place of said offsets;
    wherein using the offset-based patch reduces the number of reference changes that need to be specified in the patch, and hence reduces the size of the patch.

2. The method of claim 1, wherein converting an absolute reference into an offset-based reference comprises dividing the absolute reference into:
    an address for the target object of the absolute reference; and
    an offset for a target location of the absolute reference within the target object.

3. The method of claim 1,
    wherein an entry for a given object in the table in the location structure points to a sub-table containing offsets for each reference contained in the given object; and
    wherein the location structure allows the system to determine the locations of all references in the set of objects.

4. The method of claim 1,
wherein the method is used to patch the set of objects on a mobile device with a limited-bandwidth network connection; and
wherein using the offset-based references results in a smaller patch, which reduces the amount of data that needs to be transferred across the limited-bandwidth network connection during the patching process.

5. The method of claim 4, wherein the method further comprises generating the offset-based patch by:
obtaining a previous version of the set of objects and a new version of the set of objects;
wherein the previous version of the set of objects and the new version of the set of objects each include a corresponding location structure;
decomposing the references in the previous version of the set of objects and the new version of the set of objects into offset-based references;
calculating a set of differences between the offset-based references of the previous version of the set of objects and the new version of the set of objects;
compressing the set of differences to form the offset-based patch; and
sending the offset-based patch to the mobile device to patch the previous version of the set of objects located on the mobile device.

6. The method of claim 1, further comprising aggregating adjacent objects in the set of objects to reduce the size of the location structure.

7. The method of claim 1,
wherein the set of objects comprises a program binary; and
wherein the program binary includes a large machine-generated binary table in the J2ME™ environment.

8. The method of claim 7, wherein the program binary includes a JAVA™ system ROM image.

9. A computer-readable storage medium storing instructions that when executed by a computer cause the computer to perform a method for patching a set of objects containing references, comprising:
using a location structure to keep track of the locations of references within the set of objects, wherein the location structure includes a table that contains addresses for objects in the set of objects, and wherein each object in the set of objects includes zero or more references;
converting the references within the set of objects from absolute references into offset-based references, wherein offsets are computed with respect to base addresses of objects, wherein said offsets are stored in place of said absolute references, wherein converting the absolute references into the offset-based references involves, for each absolute reference in said each object in the set of objects:
obtaining a base address from the table for the object of the absolute reference;
computing an offset for an offset-based reference by subtracting the base address of the object from the absolute reference;
applying an offset-based patch to the set of objects and to the location structure using a binary-patching technique; and
converting the references in the set of objects from offset-based references back into absolute references, wherein said absolute references are stored in place of said offsets;
wherein using the offset-based patch reduces the number of reference changes that need to be specified in the patch, and hence reduces the size of the patch.

10. The computer-readable storage medium of claim 9, wherein converting an absolute reference into an offset-based reference comprises dividing the absolute reference into:
an address for the target object of the absolute reference; and
an offset for a target location of the absolute reference within the target object.

11. The computer-readable storage medium of claim 9,
wherein an entry for a given object in the table in the location structure points to a sub-table containing offsets for each reference contained in the given object; and
wherein the location structure allows the system to determine the locations of all references in the set of objects.

12. The computer-readable storage medium of claim 9,
wherein the method is used to patch the set of objects on a mobile device with a limited-bandwidth network connection; and
wherein using offset-based references results in a smaller patch, which reduces the amount of data that needs to be transferred across the limited-bandwidth network connection during the patching process.

13. The computer-readable storage medium of claim 12, wherein the method further comprises generating the offset-based patch by:
obtaining a previous version of the set of objects and a new version of the set of objects;
wherein the previous version of the set of objects and the new version of the set of objects each include a corresponding location structure;
decomposing the references in the previous version of the set of objects and the new version of the set of objects into offset-based references;
calculating a set of differences between the previous version of the set of objects and the new version of the set of objects;
compressing the set of differences to form the offset-based patch; and
sending the offset-based patch to the mobile device to patch the previous version of the set of objects located on the mobile device.

14. The computer-readable storage medium of claim 9, further comprising aggregating adjacent objects in the set of objects to reduce the size of the location structure.

15. The computer-readable storage medium of claim 9, wherein the set of objects comprises a program binary; and wherein the program binary includes a large machine-generated binary table in the J2ME™ environment.

16. The computer-readable storage medium of claim 15, wherein the program binary includes a JAVA™ system ROM image.

17. A computer system for patching a set of objects containing references, comprising:
a processor;
a memory coupled to the processor, wherein said memory comprises:
instructions for a locating mechanism configured to keep track of the locations of references within the set of objects, wherein the location mechanism maintains a table that contains addresses for objects in the set of objects, and wherein each object in the set of objects includes zero or more references;
instructions for a conversion mechanism configured to convert the references within the set of objects from absolute references into offset-based references, wherein offsets are computed with respect to base addresses of objects, wherein said offsets are stored in place of said absolute references, wherein converting the absolute references into the offset-based references involves, for each absolute reference in said each object in the set of objects:
  obtaining a base address from the table for the object of the absolute reference;
  computing an offset for an offset-based reference by subtracting the base address of the object from the absolute reference;
instructions for an application mechanism configured to apply an offset-based patch to the set of objects and to the location structure using a binary-patching technique; and
wherein the conversion mechanism is additionally configured to convert the references in the set of objects from offset-based references back into absolute references, wherein said absolute references are stored in place of said offsets;
wherein using the offset-based patch reduces the number of reference changes that need to be specified in the patch, and hence reduces the size of the patch.

18. The computer system of claim 17,
wherein the computer system is used to patch the set of objects on a mobile device with a limited-bandwidth network connection; and
wherein using the offset-based references results in a smaller patch, which reduces the amount of data that needs to be transferred across the limited-bandwidth network connection during the patching process.

* * * * *